US011889129B2

(12) United States Patent
Vincent

(10) Patent No.: US 11,889,129 B2
(45) Date of Patent: Jan. 30, 2024

(54) METHOD FOR SIGNALING A SUBSTITUTION TO A TERMINAL, METHOD FOR SUBSTITUTION BY A TERMINAL, AND CORRESPONDING COMPUTER PROGRAM PRODUCTS, SYSTEM AND TERMINAL

(71) Applicants: ENENSYS TECHNOLOGIES, Cesson-Sevigne (FR); TDF, Montrouge (FR)

(72) Inventor: David Vincent, Amanlis (FR)

(73) Assignees: ENENSYS TECHNOLOGIES, Cesson-Sevigne (FR); TDF, Montrouge (FR)

( * ) Notice: Subject to any disclaimer, the term of this patent is extended or adjusted under 35 U.S.C. 154(b) by 93 days.

(21) Appl. No.: 17/766,426

(22) PCT Filed: Oct. 2, 2020

(86) PCT No.: PCT/EP2020/077753
§ 371 (c)(1),
(2) Date: Apr. 4, 2022

(87) PCT Pub. No.: WO2021/064226
PCT Pub. Date: Apr. 8, 2021

(65) Prior Publication Data
US 2023/0025628 A1    Jan. 26, 2023

(30) Foreign Application Priority Data
Oct. 4, 2019    (FR) ........................................ 1910987

(51) Int. Cl.
*H04N 21/234*    (2011.01)
*H04N 21/44*    (2011.01)
(Continued)

(52) U.S. Cl.
CPC ... *H04N 21/23424* (2013.01); *H04N 21/2668* (2013.01); *H04N 21/4331* (2013.01); *H04N 21/44016* (2013.01)

(58) Field of Classification Search
None
See application file for complete search history.

(56) References Cited

U.S. PATENT DOCUMENTS 10,097,289 B2 * 10/2018 Barbotin ................ H04H 20/10
2006/0245742 A1 * 11/2006 Ashley ................. G11B 27/105
386/361
(Continued)

FOREIGN PATENT DOCUMENTS

CA        3007763 C  *  7/2021
CN      103650525 A  *  3/2014
(Continued)

OTHER PUBLICATIONS

English Translation of International Preliminary Report on Patentability dated Mar. 29, 2022 for corresponding International Application No. PCT/EP2020/077753, filed Oct. 2, 2020.
(Continued)

*Primary Examiner* — William J Kim
(74) *Attorney, Agent, or Firm* — David D. Brush; Westman, Champlin & Koehler, P.A.

(57) ABSTRACT

A method for signalling, to a terminal, substitution of an item of content, broadcast via a broadcast network to which the terminal is connected, with a substitute item of content. Such a method includes: obtaining a substitute information packet including time information indicating a time of execution, by the terminal, of an action for substituting the broadcast item of content with the substitute item of content, wherein the time information corresponds to a date of rendering of an image of the broadcast item of content with reference to a reference clock embedded in the broadcast
(Continued)

item of content; generating an event notification message including the time information; and inserting the event notification message into a data flow conveying the item of content broadcast within the broadcast network.

16 Claims, 3 Drawing Sheets

(51) Int. Cl.
*H04N 21/2668* (2011.01)
*H04N 21/433* (2011.01)

(56) References Cited

U.S. PATENT DOCUMENTS

| | | | | |
|---|---|---|---|---|
| 2008/0250101 | A1* | 10/2008 | Tanaka | H04N 7/17309 |
| 2008/0292277 | A1* | 11/2008 | Gan | H04N 21/4433 |
| | | | | 386/326 |
| 2009/0100496 | A1* | 4/2009 | Bechtolsheim | H04N 7/17336 |
| | | | | 725/147 |
| 2011/0145857 | A1 | 6/2011 | Agarwal et al. | |
| 2012/0099022 | A1* | 4/2012 | Sundy | H04N 21/812 |
| | | | | 348/E5.057 |
| 2012/0116855 | A1* | 5/2012 | Millar | G06Q 30/0241 |
| | | | | 709/219 |
| 2014/0250479 | A1* | 9/2014 | Lee | H04N 7/08 |
| | | | | 725/110 |
| 2015/0347415 | A1* | 12/2015 | Pantos | H04N 21/854 |
| | | | | 707/738 |
| 2017/0164022 | A1* | 6/2017 | Grant | H04N 21/8547 |
| 2018/0115375 | A1* | 4/2018 | Barbotin | H04N 21/234 |
| 2018/0115796 | A1* | 4/2018 | Yang | H04L 1/00 |

FOREIGN PATENT DOCUMENTS

| | | | |
|---|---|---|---|
| EP | 3235252 | A1 | 10/2017 |
| FR | 3121809 | A1 * | 10/2022 |
| JP | 2021108441 | A * | 7/2021 |
| WO | WO-2013042902 | A1 * | 3/2013 |
| WO | 2016098059 | A1 | 6/2016 |
| WO | 2019011655 | A1 | 1/2019 |
| WO | WO-2019011655 | A1 * | 1/2019 |

OTHER PUBLICATIONS

International Search Report dated Oct. 15, 2020 for corresponding International Application No. PCT/EP2020/077753, dated Oct. 2, 2020.

Written Opinion of the International Searching Authority dated Oct. 15, 2020 for corresponding International Application No. PCT/EP2020/077753, filed Oct. 2, 2020.

French Search Report and Written Opinion dated Jun. 5, 2020 for corresponding French Application No. 1910987, filed Oct. 4, 2019.

Technical Specification, "Hybrid Broadcast Broadband TV", ETSI TS 102 796 V1.4.1 (Aug. 2016).

American National Standard, "Automation System to Compression System Communications Applications Program Interface (API)", Engineering Committee Digital Video Subcommittee, Society of Cable Telecommunications Engineers, ANSI/SCTE 104 2017.

SCTE Standard, "Digital Program Insertion Cueing Message for Cable", Engineering Committee Digital Video Subcommittee, Society of Cable Telecommunications Engineers, SCTE 35 2017.

* cited by examiner

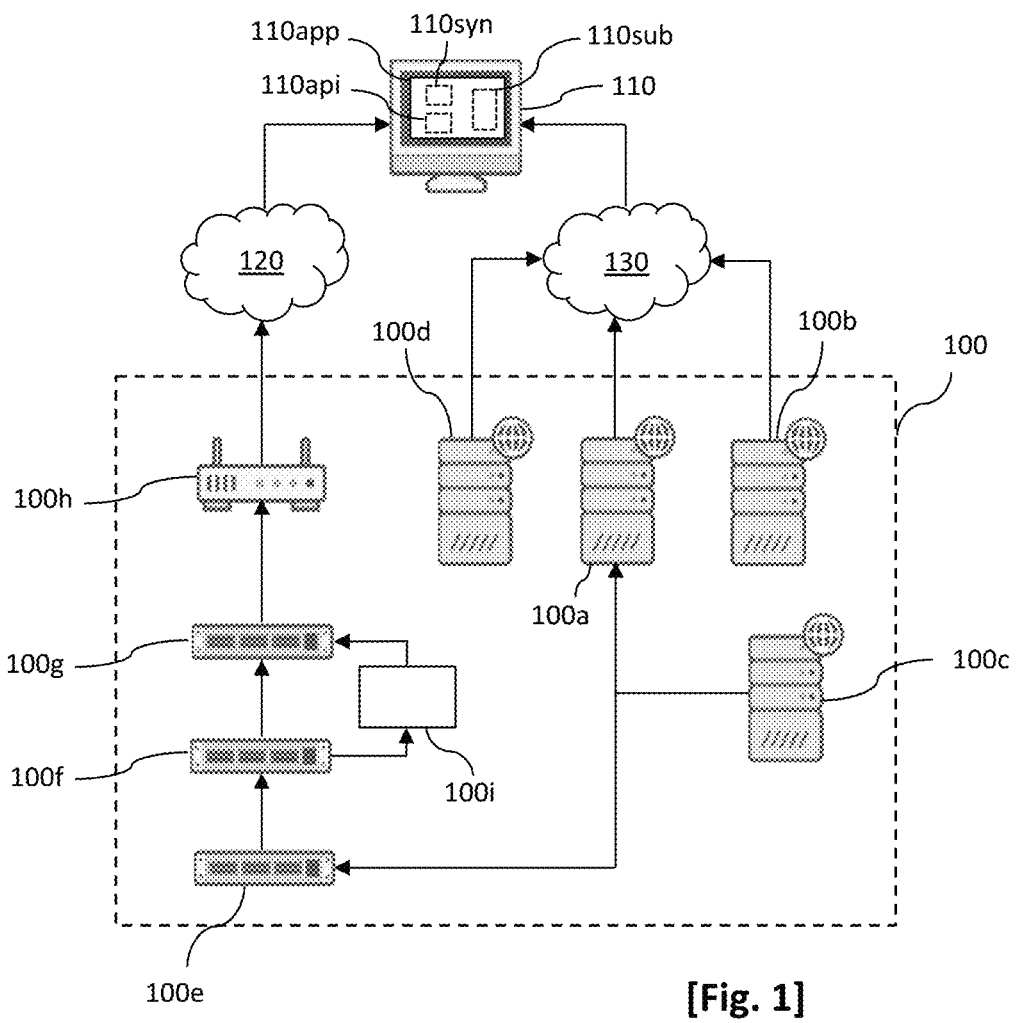
[Fig. 1]
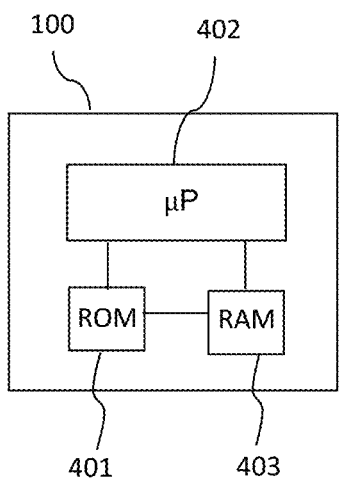
[Fig. 4]
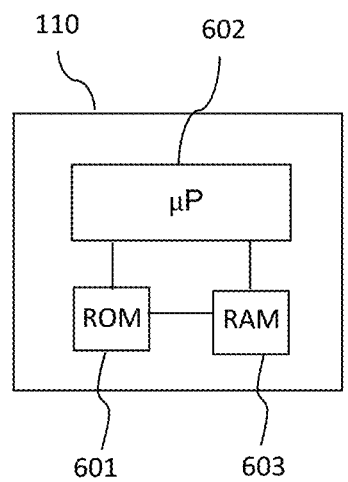
[Fig. 6]

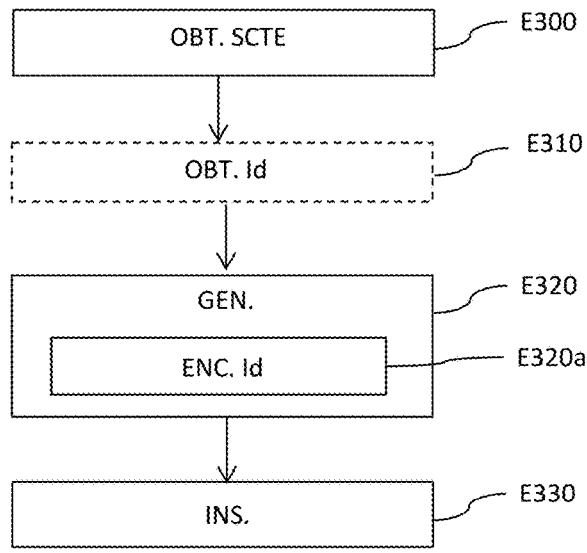
[Fig. 3]
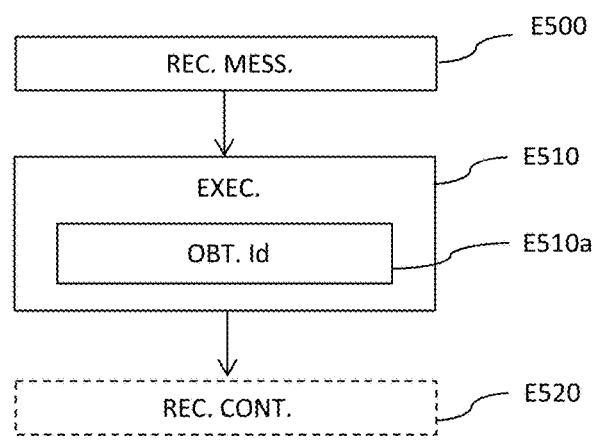
[Fig. 5]
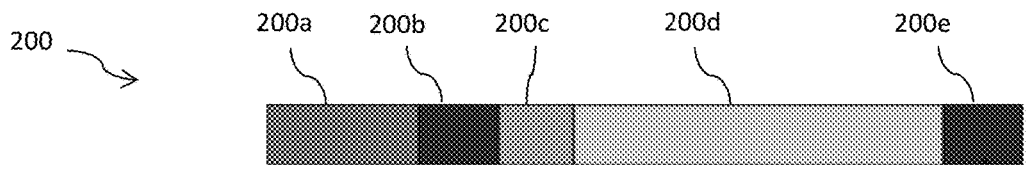
[Fig. 2]

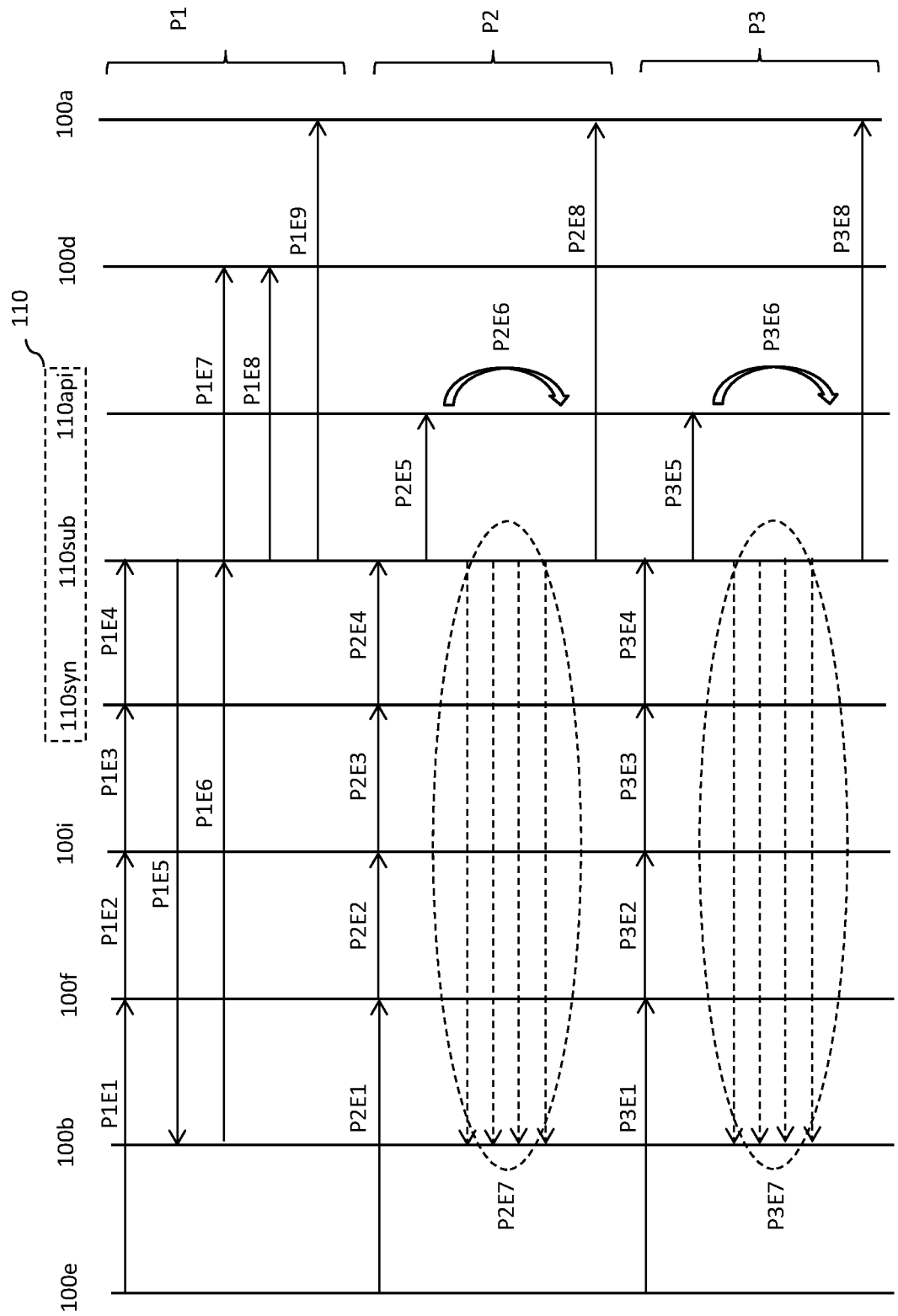
[Fig. 7]

METHOD FOR SIGNALING A SUBSTITUTION TO A TERMINAL, METHOD FOR SUBSTITUTION BY A TERMINAL, AND CORRESPONDING COMPUTER PROGRAM PRODUCTS, SYSTEM AND TERMINAL

CROSS-REFERENCE TO RELATED APPLICATIONS

This Application is a Section 371 National Stage Application of International Application No. PCT/EP2020/077753, filed Oct. 2, 2020, the content of which is incorporated herein by reference in its entirety, and published as WO 2021/064226 on Apr. 8, 2021, not in English.

FIELD OF THE INVENTION

The field of the invention is that of the substitution of content within a broadcast stream (i.e. the replacement of one content for another). This is also referred to as content insertion, or opt-out.

More specifically, the invention relates to a method for signalling, to a terminal, the substitution of a content broadcast via a broadcast network to which the terminal is connected by a content targeted for the considered terminal, as well as a corresponding substitution method implemented in the terminal.

The invention has many applications, in particular, but not exclusively, in the field of targeted advertising, the described method enabling rendering of a customised (targeted) ad at a terminal instead of an ad broadcast by a broadcast network, for example a network according to the DVB-T/T2 (standing for "Digital Video Broadcasting-Terrestrial"), ISDB-T (standing for "Integrated Services Digital Broadcasting-Terrestrial"), ATSC-3 (standing for "Advanced Television Systems Committee"), or still DTTB (standing for "Digital Television Terrestrial Broadcasting") standard.

Prior Art and Drawbacks Thereof

There are now protocols for inserting opt-out orders into a data stream conveying content broadcast within a broadcast network.

For example, the SCTE protocol (standing for "Society of Cable Telecommunications Engineers") 104 allows transmitting such orders, conventionally between a recording studio of the broadcast channel and an encoder embedded in the network head. More particularly, the considered orders are either inserted into the SDI stream (standing for "Serial Digital Interface") produced at the output of the recording studio, or conveyed in parallel with the SDI stream for example via an IP connection (standing for "Internet Protocol").

The orders in the SCTE 104 format are conventionally received by the encoder which translates them into the SCTE 35 format (another protocol) and inserts them into its MPEG-TS output stream (standing for "Moving Picture Experts Group-Transport Stream"), to a multiplexer also embedded in the network head.

Thus, the multiplexer performs switches between a national program and a local program on the basis of such received orders in order to generate a corresponding multiplexed data stream.

Solutions for signalling to a terminal the substitution of content broadcast by targeted advertisements have been developed on the basis of such protocols. For example, the solution of the British operator SKY is based on the use of the SCTE 35 protocol.

However, the (standard) SCTE 35 or 104 protocols are not standardised for the terminals intended to render the considered targeted content and are therefore not implemented by default on the latter. Thus, such solutions for signalling to a terminal require the use of a proprietary receiver at the terminal level in order to be able to interpret the received orders according to one of these SCTE 35 and 104 protocols.

Moreover, a technique for signalling a content substitution, based on the generation of event notification messages, is known from the document WO2019/011655. According to this technique, the substitution is implemented by the terminal upon receipt of the corresponding event notification message.

A technique for inserting an advertisement into a video stream broadcast live, based on the knowledge of predetermined ranges of advertisements in the stream, is also known from the document US2011/0145857.

Nonetheless, there is a need for a method for signalling a substitution of content to a general public terminal as could be found on the market in order to minimise the cost of the solution as well as to facilitate deployment thereof. In particular, there is a need for a solution enabling a terminal to perform a substitution at a specific time point.

SUMMARY

In an embodiment of the invention, is provided a method for signalling, to a terminal, the substitution of a content broadcast via a broadcast network to which the terminal is connected by a substitute content targeted at least for the terminal. Such a method comprises:

an obtainment of at least one substitute information packet comprising a piece of time information indicative of a time of execution by the terminal of at least one action for the substitution of the broadcast content by the substitute content. The piece of time information corresponds to a date of rendering of an image of said broadcast content with reference to a reference clock embedded in the broadcast content;

a generation of at least one event notification message comprising at least one piece of time information from among the piece(s) of time information received via said at least one substitute information packet; and an insertion, in a data stream conveying the content broadcast within the broadcast network, of said at least one event notification message at a time location prior to said at least one piece of time information in a chronological order of rendering of the images of the broadcast content.

Thus, the invention provides a new and inventive solution to enable the signalling to a terminal, via a broadcast network, of the substitution of a broadcast content by a targeted content (for example a targeted advertisement for a user of the considered terminal).

More particularly, the time of execution of the substitution action(s) by the terminal corresponds to a date of rendering of an image of the broadcast content with reference to a reference clock embedded in the broadcast content itself. Thus, based on the received event notification message and the reference clock embedded in the broadcast content, the terminal has the time information it needs in order to synchronise the execution of the substitution action(s) with the broadcast content.

Moreover, signalling the substitution could be based on standards already implemented in some terminals, for example via "streamevent" messages in the DSM-CC format (standing for "Digital Storage Media Command and Control").

In some embodiments, said at least one substitute information packet comprises at least one piece of identification information, said at least one action being dependent on said at least one piece of identification information. The generation comprises an encapsulation of said at least one piece of identification information in said at least one event notification message.

Thus, an event notification message could trigger several substitution actions associated to several pieces of identification information.

In some embodiments, said at least one substitute information packet comprises a unique piece of identification information which could take on several values, each associated, in the terminal, to a distinct set of at least one action. The generation comprises an encapsulation of the unique piece of identification information in said at least one event notification message.

Thus, an event notification message could trigger a predefined sequence of substitution actions associated to a given piece of identification information.

In some embodiments, the method comprises an obtainment of at least one piece of identification information not included in said at least one substitute information packet. Said at least one action is dependent on said at least one piece of identification information.

The generation comprises an encapsulation of said at least one piece of identification information in said at least one event notification message.

In some embodiments, the method comprises an obtainment a unique piece of identification information which could take on several values, each associated, in the terminal, to a distinct set of at least one action. The unique piece of identification information is not included in said at least one substitute information packet. The generation comprises an encapsulation of the unique piece of identification information in said at least one event notification message. Thus, the broadcasting system implementing the signalling method obtains the identification information through a channel other than that of the substitute information packets conveying the time information. For example, an advertisement management platform directly provides, for example via a broadband network, the identification information to the broadcasting system implementing the signalling method. In this case, the considered system associates sequentially, for example according to a predetermined order (for example according to the order of reception) the identification information received from the advertisement management platform with the time information received via the substitute information packets in order to generate the event notification messages.

In some embodiments, said at least one substitute information packet follows an SCTE 35 protocol.

In another embodiment of the invention, is provided a method for substitution, by a terminal, of a content broadcast via a broadcast network to which the terminal is connected by a substitute content targeted at least for the terminal. According to such a method, the terminal performs:

a reception of at least one event notification message inserted into a data stream conveying the broadcast content within said broadcast network. Said at least one event notification message comprises at least one piece of time information indicative of a time of execution by the terminal of at least one action for the substitution of the broadcast content by the substitute content. Said at least one piece of time information corresponds to a date of rendering of an image of said broadcast content with reference to a reference clock embedded in said broadcast content; and an execution of said at least one action at a time of execution depending on said at least one piece of time information.

Thus, based on the received event notification message and the reference clock embedded in the broadcast content, the terminal has the time information it needs in order to synchronise the execution of the substitution action(s) with the broadcast content.

Moreover, the signalling of the substitution to the terminal could be based on existing standards, for example "StreamEvents" messages in the DSM-CC format.

In some embodiments, the execution comprises an obtainment of at least one piece of identification information encapsulated in said at least one event notification message. Said at least one action is dependent on said obtained at least one piece of identification information.

In some embodiments, the execution comprises an obtainment of a unique piece of identification information which could take on several values, each associated, in the terminal, to a distinct set of at least one action. Said at least one action is dependent on the obtained unique piece of identification information.

In some embodiments, the terminal performs a reception of the targeted content via a broadband network to which the terminal is connected.

In some embodiments, said at least one action belongs to the group comprising:

a selection of the data stream clock used to carry out the synchronisation of the substitution (for example of the PCR, standing for "Program Clock Reference", or TEMI, standing for "Timed External Media Information") type;

a query for download information of said targeted content via a broadband network;

a download of said targeted content via said broadband network based on said download information;

a notification signalling that said terminal is ready to proceed with said substitution;

a decoding of said targeted content;

a rendering of the targeted content in a decoded form;

a notification signalling that said targeted content has been substituted for said broadcast content;

and a resumption of the decoding of said broadcast content.

In some embodiments, the terminal is a hybrid terminal supporting the HbbTV standard, standing for "Hybrid Broadcast Broadband TV".

In some embodiments, the data stream is in the MPEG-TS format. At least one event notification message is a "streamevent" in the DSM-CC format.

In some embodiments, the data stream is in the MPEG-TS format. The date of rendering of an image of the broadcast content is a PTS, standing for "Presentation TimeStamp". The reference clock embedded in the broadcast content is a PCR clock signal, standing for "Program Clock Reference". Complementary clocks may be conveyed in the data stream, such as a TEMI component. In particular, such a TEMI component may be conveyed in the TS packets, for example in the adaptation field ("adaptation_field"). In particular, the use of this type of complementary clock may require additional signalling like the definition of a "component_TAG" component for a TEMI clock.

The invention also relates to a computer program comprising program code instructions for the implementation of a signalling method or a substitution method (according to any one of the different aforementioned embodiments), when it is executed on a computer.

In another embodiment of the invention, is provided a broadcasting system configured to signal, to a terminal, the substitution of a content broadcast via a broadcast network to which the terminal is connected by a substitute content targeted at least for the terminal. Such a broadcasting system comprises a reprogrammable computation machine or a dedicated computation machine, configured to implement the steps of the signalling method according to the invention (according to any one of the aforementioned embodiments).

Thus, the features and advantages of this system are the same as those of the previously-described signalling method. Consequently, they are not detailed further.

In particular, such a broadcasting system comprises at least one encoder (or encoding module), one multiplexer (or multiplexing module) and one signalling device. Such entities, hardware or software, could belong to one or several piece(s) of equipment.

In another embodiment of the invention, a terminal is provided which is configured to substitute a content broadcast via a broadcast network to which the terminal is connected by a substitute content targeted at least for the terminal. Such a terminal comprises a reprogrammable computation machine or a dedicated computation machine, configured to implement the steps of the substitution method according to the invention (according to any one of the aforementioned embodiments).

Thus, the features and advantages of this terminal are the same as those of the substitution method hereinbefore. Consequently, they are not detailed further.

LIST OF FIGURES

Other aims, features and advantages of the invention will appear more clearly upon reading the following description, provided as a mere illustrative, and non-limiting, example with reference to the figures, among which:

FIG. 1 illustrates an example of a television broadcasting system to which a terminal is connected, according to an embodiment of the invention;

FIG. 2 illustrates an example of an event notification message structure as used for signalling between some entities in FIG. 1 according to an embodiment of the invention;

FIG. 3 illustrates the steps of a method for signalling, to a terminal, the substitution of a content broadcast via a broadcast network according to an embodiment of the invention;

FIG. 4 illustrates an example of a television broadcasting system structure enabling the implementation of the method of FIG. 3;

FIG. 5 illustrates the steps of a method for substitution, by a terminal, of content broadcast via a broadcast network according to an embodiment of the invention;

FIG. 6 illustrates an example of a terminal structure enabling the implementation of the method of FIG. 5;

FIG. 7 illustrates an example of actions performed by the entities of FIG. 1 during the implementation of the methods of FIG. 3 and FIG. 5 according to an embodiment of the invention.

DETAILED DESCRIPTION OF EMBODIMENTS OF THE INVENTION

In all figures of this document, identical elements and steps bear the same reference.

The general principle of the invention consists in the encapsulation in an event notification message of time information indicative of a time of execution by a terminal of at least one action for the substitution of a broadcast content with substitute content. Such time information corresponds to a date of rendering of an image of the broadcast content with reference to a reference clock embedded in the broadcast content. The event notification message is inserted into a data stream conveying the content broadcast within a broadcast network to the terminal.

Thus, based on the received event notification message and the reference clock embedded in the broadcast content, the terminal has the time information it needs in order to synchronise the execution of the substitution action(s) with the broadcast content. Moreover, the signalling of the substitution may be based on standards already implemented in some terminals, i.e. standards whose notification messages do not contain a time reference enabling a synchronous execution with respect to the broadcast data stream.

Referring to FIG. 1, a television broadcasting system 100 to which a terminal 110 is connected according to an embodiment of the invention is now described.

More particularly, the terminal 110 is a general public television set connected on the one hand to a television broadcast network 120 and on the other hand to an Internet type broadband network 130. Such a terminal 110 is sometimes also called "connected TV", "SmartTV", "Digital TV", "Internet TV", "Interactive TV", "hybrid TV", "PCTV", "Hybrid Broadcast Broadband TV", "HbbTV or "H4TV".

The terminal 110 is compatible with the HbbTV standard so as to be able to download, via the broadband network 130, a particular HbbTV application (enabling the implementation of the substitution by the terminal 110, as detailed hereinafter) from a static Internet server 100a.

Such a download is done on the basis of information received (for example a URL-type address (standing for "Uniform Resource Locator")) for example via a DVB AIT table (standing for "Digital Video Broadcasting" and "Application Information Table") contained in the data stream in the MPEG-TS format received from the television broadcasting system 100 via the broadcast network 120.

More particularly, the broadcast network 120 is for example a DTTV (standing for "Digital Terrestrial Television") network using the DVB-T standard to broadcast the data stream in the MPEG-TS format. In other embodiments, the broadcast network 120 is a satellite network using the DVB-S standard, or a cable network using the DVB-C standard. In other embodiments, the broadcast network 120 is identified with a network based on the use of a transport protocol over IP and the terminal 110 is for example a "Set-top-box" including (or communicating with) a network gateway connected to the broadband network 130. Such a transport protocol over IP is for example the UDP/IP protocol (standing for "User Datagram Protocol") enabling multicast type broadcasting, or the TCP/IP protocol (standing for "Transmission Control Protocol") enabling unicast type broadcasting as preferred by so-called OTT broadcasters (standing for "Over The Top"). In some variants, the network based on the use of an IP transport protocol shares physical resources with the broadband network 130.

Back to FIG. 1, the terminal 110 is configured to receive event notification messages 200 contained in the data stream in the MPEG-TS format conveyed by the broadcast network 120. For example, these event notification messages 200 are "StreamEvents" in the DSM-CC format (standing for "Digital Storage Media Command and Control").

The television broadcasting system 100 comprises an advertisement management platform 100c which provides one (or several) identification information (for example referencing one (or several) action(s) to be executed by the terminal 110) intended to be encapsulated in an event notification message 200 to the terminal 110. More particularly, the advertisement management platform 100c transmits the identification information:

- on the one hand to the static Internet server 100a which in turn transmits it to the terminal 110 via the broadband network 130 (for example via a file in the XML format (standing for "eXtensible Markup Language")). As discussed hereinabove, such information enables the terminal 110 to identify the substitution action(s) to be implemented; and
- on the other hand to a video production system 100e (comprising for example an SDI player and equipment enabling the insertion of a data packet in the SCTE 104 format).

The video production system 100e generates an SDI stream which is intended to be multiplexed into the data stream broadcast via the broadcast network 120 after encoding in a video encoder 100f, multiplexing by an MPEG/DVB multiplexer 100g, and generation of the broadcast modulated signal by a DVB modulator 100h.

The advertisement management platform 100c also provides the video production system 100e with an identifier of the broadcast content to be substituted. Thus, based on the identifier of the content to be substituted received from the advertisement management platform 100c, the video production system 100e determines a first synchronous time information of the SDI stream. Such first time information defines a time at which one (or several) action(s) should be executed by the terminal 110 in order to substitute the broadcast content identified by the identification information by a substitute content. In this manner, the video production system 100e generates first substitute information packets in the SCTE 104 format.

Thus, the first substitute information packets comprise the first time information and the corresponding identification information. In practice, the first time information belong to the group comprising:

- at least one absolute time reference with reference to a so-called "timecode" clock of the SDI stream; and
- at least one time difference with respect to the time position at which the first substitute information packet carrying the considered time information is inserted into the SDI stream (for example a "preroll value" of the SCTE standard 104).

Optionally, the video production system 100e also inserts the substitution duration associated to the time information and to the corresponding identification information in the first substitute information packets in the SCTE 104 format. The video production system 100e transmits the first substitute information packets to the video encoder 100f (for example via an Internet connection).

The video encoder 100f generates the MPEG-TS stream in the MPEG4 format from the stream in the SDI format received from the video production system 100e. In particular, the video encoder 100f is adapted to transform commands in the SCTE 104 format present in the received SDI stream into commands in the SCTE 35 format. More particularly, the video encoder 100f is capable of transforming the time references (for example the "timecode" or "preroll value") used by the SCTE 104 standard into PTS time references (standing for "Presentation TimeStamp") used by the SCTE 35 standard. More particularly, a given PTS time reference corresponds to a date of rendering of a corresponding image of the broadcast content with reference to a reference clock embedded in the broadcast content, herein a PCR or TEMI clock signal. In this manner, the video encoder 100f converts the first substitute information packets in the SCTE 104 format present in the received SDI stream into substitute information packets in the SCTE 35 format inserted in the MPEG-TS stream delivered thereby to the MPEG/DVB multiplexer 100g. Thus, the substitute information packets in the SCTE 35 format comprise the time information and the corresponding identification information.

For example, the time information, i.e. the PTS, is conveyed in either one of the following loops/descriptors/fields as defined in the SCTE 35 standard:
  Time_signal( )->splice_Time( );
  splice_schedule( )->utc_splice_time; and
  splice_insert( )->splice_time( )->pts_time Similarly, the identification information is, for example, conveyed in either one of the following loops/descriptors/fields as defined in the SCTE 35 standard:
  splice_info_section( )
    splice_info_commands
  splice_schedule( )
    splice_event_id (32 bits)
    unique_program_id (16 bits)
    avail_num (8 bits)
    avails_expected (8 bits)
  splice_insert( )
    splice_event_id (32 bits)
    unique_program_id (16 bits)
    avail_num (8 bits)
    avails_expected (8 bits)
  splice_descriptor( )
    avail_descriptor
      provider_avail_id (32 bits)
    DTMF_descriptor( )
      DTMF_char (N bits)
    segmentation_descriptor( )
      segmentation_event_id
      segmentation_upid (N bits, depends on segmentation_upid_type)

Optionally, the video encoder 100f also inserts the substitution duration associated to the time information and to the corresponding identification information in the substitute information packets in the SCTE 35 format.

Back to FIG. 1, on the basis of the substitute information packets in the SCTE 35 format (for example obtained via an extraction from the MPEG-TS stream originating from the video encoder 100f), a signalling device 100i generates the corresponding event notification messages, herein "StreamEvents" messages in the DSM-CC format. Such event notification messages 200 encapsulate the information conveyed by the substitute information packets, and in particular the time information (the PTS in the SCTE 35 format) and the corresponding identification information. In a particular implementation, an event notification message 200 could transport the entire SCTE 35 section (splice_info_section( ) for example). In a particular embodiment, a single PTS value is included in an event notification message. The device 100i transmits event notification messages 200 to the MPEG/DVB multiplexer 100g.

The MPEG/DVB multiplexer 100g inserts each event notification message 200 into the multiplexed stream generated thereby at a time location prior to the images whose rendering dates correspond to the time information conveyed in the considered event notification message 200. In this manner, the terminal 110 receives the event notification message 200 before the scheduled date for the execution of the corresponding substitution actions with reference to the broadcast content.

In other embodiments, device 100i is a module included in the video encoder 100f. In this case, the device 100i obtains, for example, the substitute information packets in the SCTE 35 format directly, i.e. without having to extract them from the MPEG-TS stream.

In other embodiments, the device 100i is a module included in the mpeg/dvb multiplexer 100g or a module placed downstream of the mpeg/dvb multiplexer 100g. In these embodiments, the device 100i inserts, for example, the event notification messages 200 into the MPEG-TS stream.

In other embodiments, the device 100i is a module placed in parallel with the MPEG/DVB multiplexer 100g. In these embodiments, the device 100i takes as input the multiplexed stream delivered by the MPEG/DVB multiplexer 100g and outputs all or part of the components of the stream into which it has inserted the event notification messages 200. The components of the stream into which the event notification messages 200 have been inserted are thus reinjected at the input of the MPEG/DVB multiplexer 100g.

In the present application, it should be noted that the term module could correspond to both a software component and a hardware component or a set of hardware and software components, a software component itself corresponding to one or several computer program(s) or sub-program(s) or more generally to any element of a program adapted to implement a function or a set of functions as described for the considered modules. Similarly, a hardware component corresponds to any element of a hardware set (or hardware) adapted to implement a function or a set of functions for the considered module (integrated circuit, smart card, memory card, etc.).

In other embodiments, the device 100i receives identification information directly from static Internet server 100a, for example throughout the broadband network 130. In these embodiments, the substitute information packets in the SCTE 35 format may encapsulate only the time information. In other words, the identification information is optional in the substitute information packets in the SCTE 35 format in these embodiments.

Back to FIG. 1, the DVB modulator 100h generates the modulated signal conveying the data stream delivered by the MPEG/DVB multiplexer 100g throughout the broadcast network 120.

Thus, the terminal 110 receives, on the one hand, the modulated signal conveying the event notification messages 200 delivered by the MPEG/DVB multiplexer 100g throughout the broadcast network 120 and, on the other hand, the identification information delivered by the static Internet server 100a throughout the broadband network 130.

In order to implement the substitution method (described further below with reference to FIG. 5), the terminal 110 implements a particular application 110app, of the HbbTV type, that the terminal 110 downloads from the static Internet server 100a as described hereinabove.

More particularly, the application 110app instantiates different modules, herein software:

- a module 110syn which manages the reception of the event notification messages 200 and extracts the time information (the PTS in the SCTE 35 format) therefrom as well as, where necessary, the identification information and optionally a substitution duration associated to the considered time information;
- a module 110sub which manages the identification of the substitute contents, their pre-loading and their storage in the terminal 110. The module 110sub then performs the substitution and the signalling of the state of the implemented operations. Such actions implemented by the module 110sub are further illustrated hereinbelow with reference to FIG. 7.

In other embodiments, the functions implemented in the modules 110syn, 110sub and 110api are grouped together into one single module within the application 110app. In other embodiments, the functions implemented in the modules 110syn, 110sub and 110api are implemented in several modules within the application 110app. In all embodiments of the application 110app, it could be said that the application 110app, and therefore the terminal 110, implements the functions of the aforementioned modules 110syn, 110sub and 110api.

Referring to FIG. 2, an example of an event notification message structure 200 as used for signalling between the MPEG/DVB multiplexer 100g and the terminal 110 according to an embodiment of the invention is now presented.

More particularly, the portion of the useful data of the event notification message 200 comprises a field 200a always containing the same information encoded in ascii, for example "SC". The field 200a enables the terminal 110, for example module 110syn, to identify whether the received event notification message 200 is an event notification message 200 containing substitute information.

The event notification message 200 comprises a field 200b containing one or several pieces of time information (one or several PTS in the SCTE 35 format) for substitution.

For example, a PTS is encoded on thirty-three bits according to the SCTE 35 format.

The event notification message 200 comprises a field 200c which defines in bytes the size of the data field 200d itself.

The data field 200d contains the identification information associated to the time information of the field 200b. For example, this consists of an identifier of one (or several) substitution action(s) to be executed by the terminal 101 and/or, optionally, of the substitution duration associated to the considered time information.

In turn, the field 200e conveys a CRC (standing for "Cyclic Redundancy Check"), for example a CRC 32, calculated on all of the aforementioned fields. In this manner, it could be verified that the useful portion of the event notification message 200 actually contains a substitution notification.

Referring to FIG. 3, the steps of a method for signalling, by the broadcasting system 100 to the terminal 110, the substitution of a content broadcast via the broadcast network 120 according to an embodiment of the invention are now presented.

During a step E300, the signalling device 100i obtains a substitute information packet. For example, in the embodiment of FIG. 1, the signalling device 100i extracts such substitute information packets from the MPEG-TS stream originating from the video encoder 100f. In other embodiments of the system 100 discussed hereinabove with reference to FIG. 1 and wherein the device 100i is a module included in the video encoder 100*f*, the device 100*i* obtains, for example, the substitute information packets in the SCTE 35 format directly, i.e. without having to extract them from the MPEG-TS stream.

Back to FIG. 3, the substitute information packet comprises a piece of time information (for example a PTS in the SCTE 35 format as described hereinabove with reference to FIG. 1) indicative of a time of execution by the terminal 110 of one (or several) action(s) for the substitution of the broadcast content by the substitute content. The time information corresponds to a date of rendering of an image of the broadcast content with reference to a reference clock (for example a PCR or TEMI clock as described hereinabove with reference to FIG. 1) embedded in the broadcast content.

In other embodiments, the signalling device 100*i* obtains several substitute information packets comprising such time information.

Back to FIG. 3, during a step E310, the signalling device 100*i* obtains identification information. The action(s) executed by the terminal 110 depends on the considered identification information. For example, device 100*i* receives the identification information from the static Internet server 100*a*, for example throughout the broadband network 130. In this case, the identification information is optional in the substitute information packets in the SCTE 35 format. For example, the substitute information packets in the SCTE 35 format encapsulate only time information.

In other embodiments, step E310 is not implemented and the device 100*i* obtains the identification information via the substitute information packet obtained in the aforementioned step E300. Optionally, the device 100*i* also obtains the substitution duration associated to the corresponding time information in the substitute information packets in the SCTE 35 format.

In some embodiments, the signalling device 100*i* obtains several pieces of identification information. For example, all or part of the considered identification information is obtained via one or several substitute information packet(s) obtained in the aforementioned step E300 (a given substitute information packet could optionally convey several pieces of identification information). In this case, the rest of the identification information is obtained directly from the static Internet server 100*a*, for example throughout the broadband network 130.

In some embodiments, a piece of identification information is associated to an action executed by the terminal 110. In other embodiments, a piece of identification information could take on several values each associated, in the terminal 110, to a distinct set of one or several action(s). For example, such an action belongs to the group comprising:
- a selection of the clock of the data stream used to carry out the switch synchronisation (for example of the PCR or TEMI type);
- a query for information for downloading the targeted content via the broadband network 130;
- a download of the targeted content via the broadband network 130 based on the download information;
- a notification signalling that the terminal 110 is ready to proceed with the substitution;
- a decoding of the targeted content;
- a rendering of the targeted content in a decoded form;
- a notification signalling that the targeted content has been substituted for the broadcast content; and
- a resumption of the decoding of the broadcast content.

Such actions are illustrated further below with reference to FIG. 7.

Back to FIG. 3, during a step E320, the signalling device 100*i* generates an event notification message 200 (for example a "StreamEvents" message in the DSM-CC format as described hereinabove with reference to FIG. 1) comprising at least one piece of time information from among the time information received via the substitute information packet(s) obtained during the aforementioned step E300.

During a step E320*a*, the signalling device 100*i* encapsulates, in the event notification message 200, at least one obtained piece of identification information.

For example, in the embodiments in which the signalling device 100*i* obtains several pieces of identification information directly from the static Internet server 100*a* and several pieces of time information via the substitute information packets in the SCTE 35 format, the signalling device 100*i* associates for example sequentially, for example according to a predetermined order (for example according to the order of reception) the identification information to the time information in order to generate the event notification messages 200.

In some embodiments, the signalling device 100*i* generates several such event notification messages 200 from several pieces of time information and several pieces of identification information obtained beforehand.

In some embodiments, the signalling device 100*i* does not implement the encapsulation step E320*a* and the event notification message(s) 200 do not comprise identification information. In this case, such an event notification message 200 triggers one (or several) predetermined action(s) in the terminal 110.

In some embodiments, an event notification message 200 comprises time information and associated identification information.

In some embodiments, an event notification message 200 comprises time information and several associated identification information (for example to identify a substitute content and one or several associated action(s)) In some embodiments, an event notification message 200 comprises several pieces of time information and several associated identification information.

Back to FIG. 3, during a step E330, the MPEG/DVB multiplexer 100*g* inserts into the data stream conveying the content broadcast within the broadcast network 120, the event notification message(s) 200 generated during the implementation of step E320. For this purpose, the event notification message(s) 200 has/have been transmitted beforehand by the signalling device 100*i* to the MPEG/DVB multiplexer 100*g*. More particularly, the MPEG/DVB multiplexer 100*g* inserts each event notification message 200 into the multiplexed stream at a time location prior to the images whose rendering dates correspond to the time information conveyed in the considered event notification message 200.

In this manner, the terminal 110 receives the event notification message 200 before the scheduled date for the execution of the corresponding substitution actions with reference to the broadcast content.

In other embodiments of the system 100 discussed hereinabove with reference to FIG. 1 and wherein the device 100*i* is a module included in the MPEG/DVB multiplexer 100*g*, the device 100*i* for example itself inserts the event notification message(s) 200 into the data stream.

FIG. 4 presents an example of a structure of the television broadcasting system 100, enabling the implementation of the signalling method of FIG. 3. The system 100 comprises a random-access memory 403 (for example a RAM memory), a processing unit 402 equipped for example with a processor, and controlled by a computer program stored in a read-only memory 401 (for example a ROM memory or a hard disc). On initialisation, the code instructions of the computer program are for example loaded into the random-access memory 403 before being executed by the processor of the processing unit 402.

This FIG. 4 only illustrates one particular way, among several possible ones, for implementing the system 100, so that it performs some steps of the signalling method detailed hereinabove, with reference to FIG. 3 (in any one of the different embodiments). Indeed, these steps could be carried out indifferently on a reprogrammable computation machine (a PC computer, a DSP processor or a microcontroller) executing a program comprising a sequence of instructions, or on a dedicated computation machine (for example a set of logic gates like a FPGA or an ASIC, or any other hardware module). In the case where the system 100 is implemented with a reprogrammable computation machine, the corresponding program (i.e. the sequence of instructions) could be stored, or not, in a removable storage medium (such as a CD-ROM, a DVD-ROM, a USB key, etc.), this storage medium being partially or totally readable by a computer or a processor.

In some embodiments, the entities or modules 100*a* to 100*i* composing the system 100 of FIG. 1 are made in the form of completely or partly distinct hardware components.

In this case, all of the considered hardware components comprise means equivalent to those described hereinabove with reference to FIG. 4.

Referring to FIG. 5, the steps of a method for substitution, by the terminal 110, of a content broadcast via the broadcast network 120 according to an embodiment of the invention are now presented.

During a step E500, the terminal 110 receives the event notification message(s) 200 inserted into a data stream conveying the content broadcast within the broadcast network 120. As described hereinabove for example with reference to the signalling method in FIG. 3, the event notification message(s) comprises at least one piece of time information indicative of a time of execution by the terminal 110 of at least one action for the substitution of the broadcast content by the substitute content. Said at least one piece of time information corresponds to a date of rendering of an image of the broadcast content (for example a PTS in the SCTE 35 format as described above with reference to FIG. 1) with reference to a reference clock (for example a PCR or TEMI clock as described hereinabove with reference to FIG. 1) embedded in the broadcast content.

Thus, based on the received event notification message and the reference clock embedded in the broadcast content, the terminal 110 has the time information it needs in order to synchronise the execution of the substitution action(s) with the broadcast content.

During a step E510, the terminal 110 executes said at least one action at a time of execution depending on said at least one piece of time information.

For this purpose, during a step E510*a*, the terminal 110 obtains one (or several) identification information encapsulated in the event notification message(s). Said at least one action is dependent on the identification information thus obtained.

In some embodiments, a piece of identification information is associated to an action executed by the terminal 110. In other embodiments, a piece of identification information could take on several values each associated, in the terminal 110, to a distinct set of one or several action(s). In other embodiments, no identification information is included in the event notification message(s). In this case, such an event notification message 200 triggers one (or several) predetermined action(s) in the terminal 110.

Examples of such actions have been provided hereinabove with reference to FIG. 3 as well as hereinbelow with reference to FIG. 7.

During a step E520, the terminal 110 receives the targeted content, for example from the content server 100*d* via the broadband network 130 to which said terminal is connected.

For example, the targeted content is identified by a piece of identification information obtained during the implementation of step E510*a*.

In other embodiments, the terminal 110 does not implement step E520 and the targeted content is included for example in the application 110app implemented on the terminal 110.

FIG. 6 presents an example of structure of a terminal 110, enabling the implementation of the substitution method of FIG. 5. The terminal 110 comprises a random-access memory 603 (for example a RAM memory), a processing unit 602 equipped for example with a processor, and controlled by a computer program stored in a read-only memory 601 (for example a ROM memory or a hard disc). On initialisation, the code instructions of the computer program are for example loaded into the read-only memory 603 before being executed by the processor of the processing unit 602.

This FIG. 6 illustrates only one particular way, among several possible ones, for implementing the terminal 110, so that it performs some steps of the substitution method detailed hereinabove, with reference to FIG. 6 (in any one of the different embodiments). Indeed, these steps may be carried out either on a reprogrammable computation machine (a PC computer, a DSP processor or a microcontroller) executing a program comprising a sequence of instructions, or on a dedicated computation machine (for example a set of logic gates like a FPGA or an ASIC, or any other hardware module). In the case where the terminal 110 is implemented with a reprogrammable computation machine, the corresponding program (i.e. the sequence of instructions) could be stored in a removable storage medium (such as a CD-ROM, a DVD-ROM, a USB key, etc.) or not, this storage medium being partially or totally readable by a computer or a processor.

Referring to FIG. 7, an example of actions performed by the entities of FIG. 1 during the implementation of the methods of FIG. 3 and FIG. 5 according to an embodiment of the invention is now presented.

Phase P1: Preparation for the Substitution of the Broadcast Content

During a step P1E1, the video production system 100*e* generates a first substitute information packet in the SCTE 104 format and transmits it to the video encoder 100*f* via the SDI stream. Thus, the first substitute information packet comprises a first piece of time information and several corresponding pieces of identification information. In the present case, the identification information identifies a sequence of actions to be executed by the terminal 110 in order to prepare the substitution of the broadcast content by a targeted content.

During a step P1E2, the video encoder 100*f* converts the first substitute information packet in the SCTE 104 format present in the received SDI stream into a substitute information packet in the SCTE 35 format inserted into the MPEG-TS stream that it outputs to the MPEG/DVB multiplexer 100*g*. The substitute information packet in the SCTE 35 format comprises a piece of time information corresponding to the conversion of the first piece of time information in the SCTE 35 format (for example a PTS in the SCTE 35 format) as well as the associated identification information.

The signalling device 100i implements some steps of the method of FIG. 3 and obtains the substitute information packet in the SCTE 35 format. Thus, the device 100i generates a corresponding event notification message 200 (for example a "StreamEvents" in the DSM-CC format). The event notification message 200 encapsulates the time information and the associated identification information.

According to a first example, the time information is a PTS whose value gives the time of execution, by the terminal, of the sequence of actions allowing preparing the substitution of the broadcast content for a targeted content. According to a second example, the time information is a PTS whose value gives the time of execution, by the terminal, of the substitution. The event notification message 200 is inserted into the MPEG-TS stream.

During a step P1E3, the module 110syn of the HbbTV application 110app of the terminal 110 receives the event notification message 200 and extracts therefrom the time information as well as the associated identification information (for example by implementing some steps of the method of FIG. 5).

During a step P1E4, the module 110sub receives the time information as well as the associated identification information. On this basis, the module 110sub manages the identification of the substitute contents, their pre-loading and their storage in the terminal 110.

For this purpose, during a step P1E5, the module 110sub sends a content query to the allocation server 100b.

During a step P1E6, the allocation server 100b returns a reply to the module 110sub, for example in the VAST (standing for "Digital Video Ad Serving Template") or VMAP (standing for "Video Multiple Ad Playlist") format. This reply contains the necessary information, for example one or several URL(s) (standing for "Uniform Resource Locator"), so that the terminal 110 could download the substitute content to be displayed possibly as well as the information to be used when reporting the progress status of the substitution by the substitute contents.

During a step P1E7, the module 110sub carries out the pre-loading of a first substitute content, from the content server 100d on the basis of the information obtained during the implementation of step P1E6.

During a step P1E8, the module 110sub carries out the pre-loading of a second substitute content, from the content server 100d on the basis of the information obtained during the implementation of step P1E6.

During a step P1E9, the 110sub module reports a technical signal to the static Internet server 100a to indicate that the terminal 110 is ready for the substitution of the broadcast content.

Phase P2: Substitution of the Content Broadcast by the First Substitute Content

Steps P2E1 to P2E4 are identical to steps P1E1 to P1E4 of Phase 1, except that they herein relate to the substitution of the broadcast content by the substitute content obtained during Phase P1. Thus, only the nature of the identification information is different in order to trigger the corresponding actions at the terminal 110. As regards the time information, this consists for example of a PTS whose value gives the time of execution, by the terminal, of the substitution. In particular, the time information may be identical to that transmitted in the event notification message used for the preparation of the substitution during step P1E2.

During a step P2E5, the module 110syn prepares the substitution via the module 110api implementing an API (standing for "Application Programming Interface") HbbTV TA (standing for "Targeted Advertisement"). More particularly, the module 110sub passes to the module 110api the time information (for example a PTS) and the reference of the pre-loaded first substitute content during the implementation of step P1E7.

During a step P2E6, the module 110api proceeds with the substitution of the broadcast content by the pre-loaded first substitute content.

During a step P2E7, the module 110sub reports a signal on the progress of the substitution of the broadcast content by the first substitute content, for example by sending VAST queries to the server 100b.

During a step P2E8, the 110sub module reports a technical signal to the static Internet server 100a to allow for an efficient management of the authorised terminals. For example, the static Internet server 100a analyses the information sent thereto by all terminals implementing one or several substitution(s). If the analysis shows a systematic dysfunction on a terminal type, the static Internet server 100a designates the terminals of the considered type as undesirable. The static Internet server 100a refrains from providing new substitution information to the terminals of the considered type.

Phase P3: Substitution of the Content Broadcast by the Second Substitute Content Steps P3E1 to P3E8 are identical to steps P2E1 to P2E8 of Phase 2, except that they relate herein to the substitution of the broadcast content by the second substitute content in place of the first substitute content. Consequently, steps P3E1 to P3E8 are not detailed further more.

Although the present disclosure has been described with reference to one or more examples, workers skilled in the art will recognize that changes may be made in form and detail without departing from the scope of the disclosure and/or the appended claims.

The invention claimed is:

1. A method for signalling, to a terminal, substitution of a content broadcast via a broadcast network to which said terminal is connected by a substitute content targeted at least for said terminal, wherein the method is implemented by a broadcasting system and comprises:

obtaining at least one substitute information packet in a Society of Cable Telecommunications Engineers (SCTE) 35 format comprising a piece of time information, Presentation TimeStamp (PTS), indicative of a time of execution by said terminal of at least one action for the substitution of the broadcast content by the substitute content, said piece of time information corresponding to a date of rendering of an image of said broadcast content with reference to a reference clock embedded in said broadcast content;

generating at least one event notification message, StreamEvent, in a Digital Storage Media Command and Control (DSM-CC) format and comprising at least one piece of time information from among the at least one piece of time information received via said at least one substitute information packet; and inserting, in a data stream conveying said content broadcast within said broadcast network, said at least one event notification message at a time location prior to said at least one piece of time information in a chronological order of rendering of the images of said broadcast content.

2. The method according to claim 1, wherein said at least one substitute information packet comprises at least one piece of identification information, said at least one action being dependent on said at least one piece of identification information,
and wherein said generating comprises encapsulating said at least one piece of identification information in said at least one event notification message.

3. The method according to claim 1, wherein said at least one substitute information packet comprises a unique piece of identification information which can take on several values, each associated, in the terminal, to a distinct set of at least one action, and wherein said generating comprises encapsulating said unique piece of identification information in said at least one event notification message.

4. The method according to claim 1, comprising obtaining at least one piece of identification information not comprised in said at least one substitute information packet, said at least one action being dependent on said at least one piece of identification information,
and wherein said generating comprises encapsulating said at least one piece of identification information in said at least one event notification message.

5. The method according to claim 1, comprising obtaining a unique piece of identification information which can take on several values, each associated, in the terminal, to a distinct set of at least one action, said unique piece of identification information not being comprised in said at least one substitute information packet,
and wherein said generating comprises encapsulating said unique piece of identification information in said at least one least one event notification message.

6. The method according to claim 1, wherein the terminal is a hybrid terminal supporting "a Hybrid Broadcast Broadband TV" Targeted Advertisement (HbbTV TA) standard.

7. The method according to claim 1, wherein said data stream is in an MPEG-TS format, standing for "Moving Picture Experts Group-Transport Stream", and wherein said reference clock embedded in said broadcast content is a Program Clock Reference (PCR) or a Timed External Media Information (TEMI) clock signal.

8. A method for substitution, by a terminal, of a content broadcast via a broadcast network to which said terminal is connected by a substitute content targeted at least for said terminal, wherein the method is performed by said terminal and comprises:
receiving at least one event notification message, StreamEvent, in a Digital Storage Media Command and Control (DSM-CC) format and inserted into a data stream conveying said broadcast content within said broadcast network, said at least one event notification message comprising at least one piece of time information, Presentation TimeStamp (PTS), indicative of a time of execution by said terminal of at least one action for the substitution of the broadcast content by the substitute content, said at least one piece of time information corresponding to a date of rendering of an image of said broadcast content with reference to a reference clock embedded in said broadcast content; and
executing said at least one action at a time of execution depending on said at least one piece of time information.

9. The method according to claim 8, wherein said executing comprises obtaining at least one piece of identification information encapsulated in said at least one event notification message,
and wherein said at least one action is dependent on said obtained at least one piece of identification information.

10. The method according to claim 8, wherein said executing comprises obtaining a unique piece of identification information which can take on several values, each associated, in the terminal, to a distinct set of at least one action,
and wherein said at least one action is dependent on said obtained unique piece of identification information.

11. The method according to claim 8, comprising said terminal receiving said targeted content via a broadband network to which said terminal is connected.

12. The method according to claim 1, wherein said at least one action belongs to the group consisting of:
a selection of a data stream clock used to synchronise the substitution;
a query for download information of said targeted content via a broadband network;
a download of said targeted content via said broadband network based on said download information;
a notification signalling that said terminal is ready to proceed with said substitution;
a decoding of said targeted content;
a rendering of the targeted content in a decoded form;
a notification signalling that said targeted content has been substituted for said broadcast content; and
a resumption of the decoding of said broadcast content.

13. The method according to claim 8, wherein said at least one action belongs to the group consisting of:
a selection of a data stream clock used to synchronise the substitution;
a query for download information of said targeted content via a broadband network;
a download of said targeted content via said broadband network based on said download information;
a notification signalling that said terminal is ready to proceed with said substitution;
a decoding of said targeted content;
a rendering of the targeted content in a decoded form;
a notification signalling that said targeted content has been substituted for said broadcast content; and
a resumption of the decoding of said broadcast content.

14. The method according to claim 8, wherein the terminal is a hybrid terminal supporting a Hybrid Broadcast Broadband TV Targeted Advertisement (HbbTV TA) standard.

15. The method according to claim 8, wherein said data stream is in an MPEG-TS format, standing for "Moving Picture Experts Group-Transport Stream", and wherein said reference clock embedded in said broadcast content is a Program Clock Reference (PCR) or a Timed External Media Information (TEMI) clock signal.

16. A broadcasting system configured to signal, to a terminal, substitution of a content broadcast via a broadcasting network to which said terminal is connected by a substitute content targeted at least for said terminal, wherein the broadcast system comprises:
a reprogrammable computation machine or a dedicated computation machine, configured to:
obtain at least one substitute information packet in a Society of Cable Telecommunications Engineers (SCTE) 35 format comprising a piece of time information, Presentation TimeStamp (PTS), indicative of a time of execution by said terminal of at least one action for the substitution of the broadcast content by the substitute content, said time information corresponding to a date of rendering of an image of said broadcast content with reference to a reference clock embedded in said broadcast content;

generate at least one event notification message, StreamEvent, in a Digital Storage Media Command and Control (DSM-CC) format and comprising at least one piece of time information from among the at least one time piece of information received via said at least one substitute information packet; and insert, in a data stream conveying said content broadcast within said broadcast network, said at least one event notification message at a time location prior to said at least one piece of time information in a chronological order of rendering of the images of said broadcast content.

* * * * *